March 26, 1974     P. SCHMALFELD ET AL     3,799,747

FUEL BURNER SYSTEM FOR A FLUIDIZED BED

Original Filed April 23, 1969     2 Sheets-Sheet 1

INVENTORS

Paul Schmalfeld
Roland Rammler

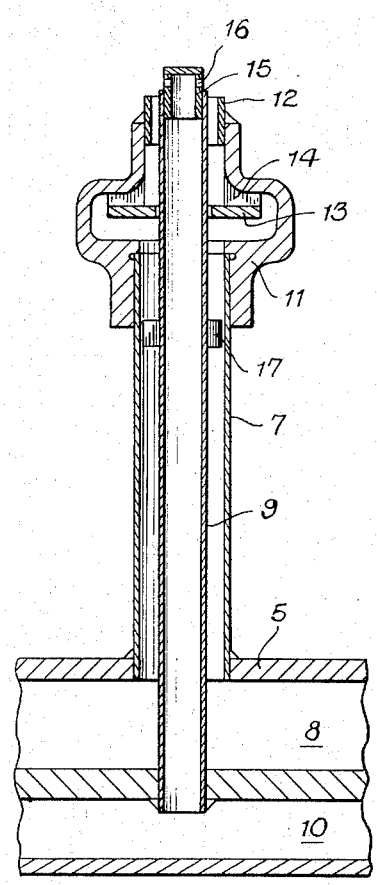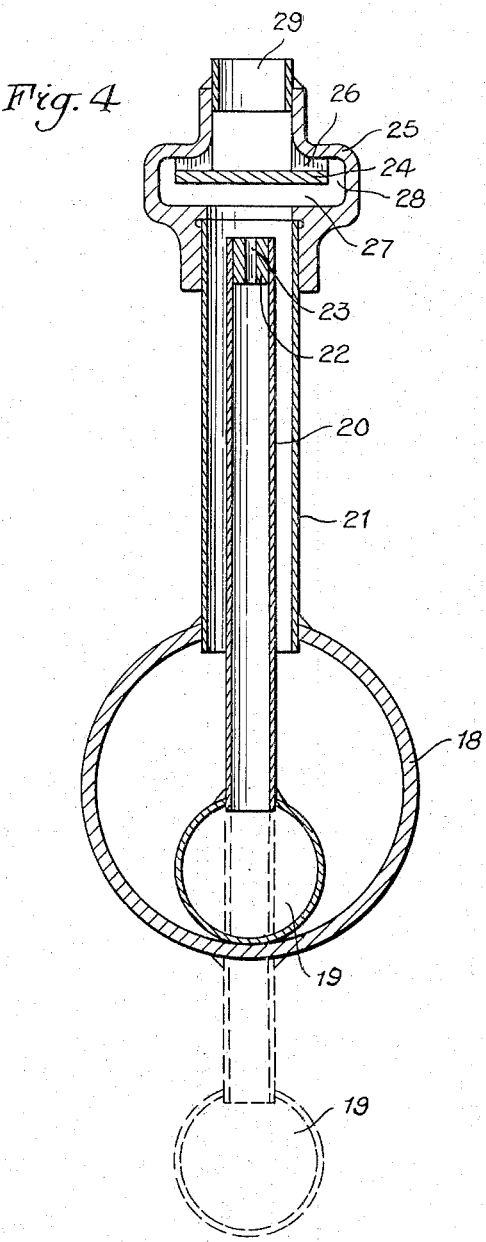

United States Patent Office 3,799,747
Patented Mar. 26, 1974

3,799,747
FUEL BURNER SYSTEM FOR A
FLUIDIZED BED
Paul Schmalfeld, Bad Homburg, and Roland Rammler, Frankfurt am Main, Germany, assignors to Metallgesellschaft Aktiengesellschaft, Frankfurt am Main, Germany
Continuation of abandoned application Ser. No. 818,530, Apr. 23, 1969. This application Apr. 13, 1971, Ser. No. 133,716
Claims priority, application Germany, Apr. 27, 1968, P 17 58 244.4
Int. Cl. B01j 9/18; F27b 15/14
U.S. Cl. 23—277 R                4 Claims

ABSTRACT OF THE DISCLOSURE

A plurality of upwardly extending burner nozzles are horizontally spaced and form a two-dimensional substantially horizontal array and each has at least one fluid outlet opening. An air distributor is disposed below said array and has a wall. Air supply conduits connect said air distributor to each of said burner nozzles. A fuel distributor is connected to each of said burner nozzles by fuel supply conduits extending through said wall. The fluid outlet openings are disposed in a reactor chamber defined by a reactor structure of a fuel-burning reactor for carrying out a reaction in a fluidized bed. Said reactor chamber extends over said array.

---

This is a streamlined continuation application of Ser. No. 818,530, filed Apr. 23, 1969, and now abandoned.

This invention relates to an apparatus for supplying fuel and combustion air to a fluidized bed at the same time.

In many cases in which it is desired to heat fine-grained solids, particularly solids which are not combustible, to high temperatures in a fluidized bed, hot combustion gases are supplied from below the bed through the perforated distributing bottom of a fluidized bed furnace. These gases deliver heat to the fine-grained solids and agitate the latter. Distributing bottoms of high-alloy steel are required for the supply of hot gases. It is not possible to produce the hot combustion gases with a very small excess of air and with preheated air because this would result in a gas which is too hot. In most cases, the combustion temperatures must be reduced by a large excess of air or by an admixture of cooler gases which have been recycled. This operation requires a relatively high cost. The thermal efficiency is relatively low and it is necessary in most cases to increase the cross-section of the fluidized bed.

It is also known to produce the hot combustion gas in the fluidized bed itself. In such case, combustion air, which serves at the same time as a fluidizing agent, is supplied through all or part of the openings of the distributing bottom from an underlying air blast box. Gaseous fuel is supplied to the fluidized bed through the remaining openings and special nozzles connected thereto, or through lances disposed on the periphery of the fluidized bed furnace. In this operation, it is most difficult to effect a complete combustion with a low excess of air because it is difficult to effect a thorough mixing of the combustion air and fuel and afterburning may take place above the fluidized bed. For this reason, a higher excess of air or a much higher fluidized bed is required in this mode of operation. These requirements result in a lower thermal efficiency, a lower unit heat transfer and/or a requirement for a higher combustion air supply pressure so that higher initial costs and an increased power requirement are involved.

It is an object of this invention to eliminate these disadvantages.

This object is accomplished in this invention in that a number of nozzle connections consisting each of two short connecting pipes disposed one within the other are inserted in openings through the distributing bottom, the outer connecting pipe of each nozzle connection is connected to the air blast box disposed under the distributing bottom and serving to supply the combustion air, the inner connecting pipe is connected to a distributor which is disposed under the blast box and serves to supply the fuel, and said nozzle connections discharge into nozzle bodies, which are connected to the outlet end of the connections by clamping, fitting or welding.

This invention thus provides for the direct heating of a fluidized bed, an apparatus which comprises means for supplying fuel and air from below up into the fluidized bed.

The apparatus of this invention is characterized by a plurality of burner nozzles, which are distributed over the cross-section of the fluidized bed and have outlet openings for air and fuel, air supply conduits leading from the air blast box of the fluidized bed reactor to said nozzles, and fuel supply conduits extending from a fuel distributor through the wall of the air blast box to said nozzles.

Each burner nozzle consists of a nozzle connection, which is formed by two connecting pipes disposed one in the other, and a two-part nozzle body, which is secured to the outlet end of at least one of the connecting pipes. The inner connecting pipe serves to supply fuel.

The nozzle body is provided with air and fuel discharge openings, and these openings are arranged so that the air and fuel meet at an angle suitably amounting to about 90°.

The air blast box and the box-like fuel distributor may be superimposed so that the top of the air blast box forms the bottom of the reactor and the bottom of the air blast box forms the top of the fuel distributor.

The air blast box and the box-like fuel distributor may be subdivided into juxtaposed chambers in an arrangement in which the reactor bottom constitutes a common bottom of the air blast box chambers and a common top of the chambers of the fuel distributor.

The air blast box which is divided into chambers may alternatively consist of parallel pipes, which form a reactor grate and are supplied from a manifold. The pipes which constitute the fuel distributor and are also supplied from a manifold may then be disposed in or below the air blast box pipes. The burner nozzles are connected by their outer connecting pipes to the air-carrying pipes and by their inner connecting pipes to the fuel-carrying pipes. In the second case, the inner connecting pipes extend through the walls of the air-carrying pipes and connected to the fuel-carrying pipes.

The upward movement of the fuel-air mixture flowing out of the nozzle bodies entrains the fine-grained solids upwardly out of the fluidized bed. These solids are sucked from all sides to the nozzle bodies and are thus rapidly recirculated in the fluidized bed. This motion ensures that the heat which is released by the combustion is rapidly transferred to the recirculating fine-grained solids so that dangeous overheating is avoided.

The fuel outlet openings formed in the nozzle body and connected to the inner connecting pipes are suitably horizontally directed or have a downward inclination in the direction of flow. This arrangement will prevent a clogging of said openings by fine-grained solids from the fluidized bed. The streams of combustion air and fuel leaving the respective nozzle bodies intersect on each other approximately at right angles so that the combustion air and fuel are thoroughly mixed as they flow out of the nozzle body.

To prevent an entry of granular solids to be treated from the fluidized bed into the nozzle body when the supply of air is interrupted or heavily throttled, the nozzle body may contain a horizontal constricting plate, which leaves only an annular gap for the air stream between said plate and the wall of the nozzle body.

Particularly where liquid fuel is used, a thorough mixing of the fuel and combusion air before they leave the nozzle body will improve the combusion as a whole.

With this object in mind, it is a feature of this invention that the inner part of the nozzle body is connected to the inner connecting pipe and formed with the fuel outlet opening, which terminates closely below the outlet end of the outer connecting pipe, and that the fuel and air are mixed under a constricting plate so that the mixture leaves the nozzle body through the gap and a common outlet opening. Such nozzle connection may only be used, however, if there is no danger that the nozzle may be clogged by granular solids from the fluidized bed and combustion air cannot flow back into the fuel-carrying connecting pipe and into the fuel-supplying chamber, where an explosive mixture might be formed.

In fluidized bed furnaces having a large cross-sectional area, it has been found to be desirable to divide the air blast box and the fuel distributor into chambers and to arrange the latter on both sides of the reactor bottom. It is suitable to provide a plurality of juxtaposed chambers for supplying combustion air on the reactor bottom and to provide a plurality of juxtaposed chambers for supplying fuel under the reactor bottom. In this arrangement, steel beams for stiffening and supporting the reactor bottom may be disposed in the space between the several chambers so that the carrying parts of the bottom will not be subjected to overheating and dangerous thermal stresses. The chambers for supplying the combusion air, which are disposed on the reactor bottom, are protected from overheating in that the nozzle connections protrude 10–30 centimeters, preferably 20–30 centimeters, above the upper portions of the chambers for supplying the combustion air. In such an arrangement, solids from the fluidized bed can deposit around the connecting pipes and form a heat-insulating layer between the incandescent fluidized bed and the upper portions of the chambers for supplying the combustion air. A heat insulation may alternatively be provided in that the upper chamber portions are provided with insulating layers of lagging material.

If the solids to be heated in the fluidized bed are to be withdrawn through openings in the reactor bottom, the same should be formed by a grate of juxtaposed parallel pipes for supplying combustion air. The pipes for supplying the fuel are concentrically or eccentrically disposed in the pipes for supplying combustion air. The nozzle connections are then welded to said pipes and have a spacing of, e.g., 20–50 centimeters.

The pipes for supplying the fuel may alternatively be disposed below the pipes for supplying the combustion air. In this case, the inner tubular pipes of the nozzle connections extend radially through the grate-forming pipes for supplying the air.

The means by which the objects of this invention are obtained are described more fully with reference to the accompanying drawings in which:

FIG. 2 is a vertical cross-sectional view showing a single burner nozzle;

FIG. 4 is a vertical cross-sectional view showing another arrangement of a burner nozzle, air distributor and fuel distributor.

Figure 1:
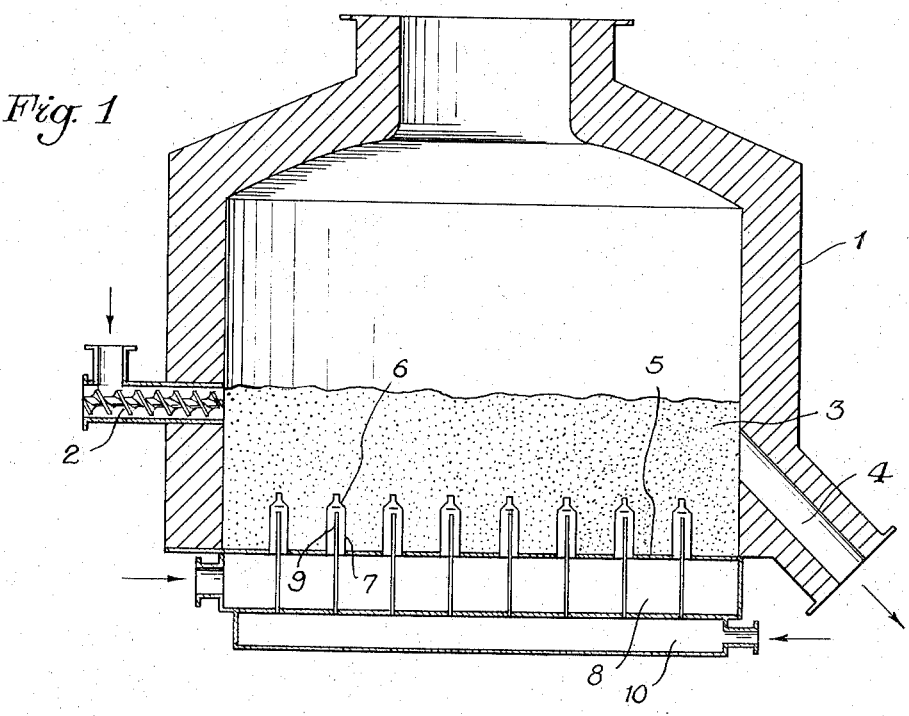
FIG. 1 is a vertical cross-sectional view showing a fluidized bed reactor provided with the heating apparatus of this invention.

FIG. 1 is a cross-sectional view showing a fluidized bed furnace 1 in which a feed conveyor screw 2 supplies a fluidized bed 3 with fine-grained solids to be treated. The heat-treated solids are withdrawn through a connecting pipe 4. Nozzle connections 6 are inserted in the reactor bottom 5 and each comprises an outer connecting pipe 7 connected to an air blast box 8 and an inner connecting pipe 9 connected to a fuel-distributing system 10. Because the inner connecting pipes 9 are not rigidly connected to the reactor bottom 5 but secured in the bottom of the air blast box, these pipes may expand freely so that thermal stresses are avoided.

FIG. 2 shows a single nozzle connection, which consists of an outer connecting pipe 7 and an inner connecting pipe 9. An outer nozzle body member 11 is secured to the outer connecting pipe 7 and terminates in a calibrated outlet opening 12. The inner connecting pipe 9 terminates in an inner nozzle body member 15, which is formed with outlet openings 16 that are horizontal or have a downward inclination. Fine-grained solids cannot enter the openings 16 even when air is supplied only at a low rate. A constricting plate 13 is disposed below the outlet opening 12 and secured in the outer nozzle body member 11 by webs 14. This constricting plate prevents an entry of fine-grained solids from the fluidized bed into the annular space between the outer and inner connecting pipes when the supply of air is interrupted or heavily throttled. The webs 14 of the constricting plate 13 constitute vanes which impart a swirl to the outflowing combustion air. Wings 17 are carried by the inner connecting pipe 9 and enable a centered mounting of the connecting pipe 9.

Figure 3:
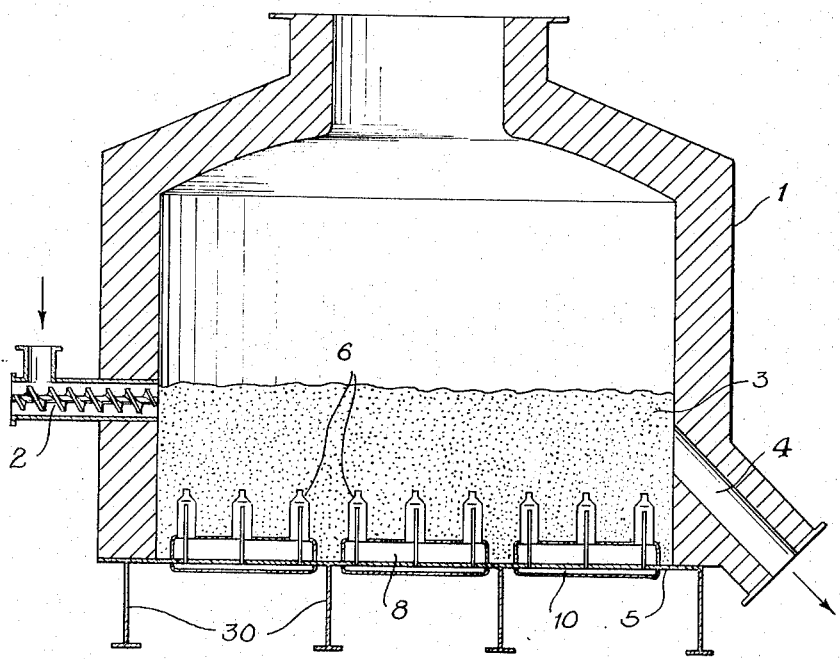
FIG. 3 is a vertical cross-sectional view showing a fluidized bed reactor in which the blast box and the fuel distributor are divided into juxtaposed chambers.

FIG. 3 is a vertical sectional view showing a fluidized bed furnace, in which a plurality of chambers 8 for supplying the combustion air are provided on the reactor bottom 5 and a plurality of chambers 10 for the fuel distributor are provided under the reactor bottom 5. Steel beams 30 for stiffening and supporting the reactor bottom may be disposed between the individual chambers of the fuel distributor.

In the embodiment shown in FIG. 4, the nozzle connections are supplied with combustion air through a pipeline 18 and with fuel through a pipeline 19, which is eccentrically disposed in the pipeline 18. It is indicated by dotted lines that the pipelines 19 for supplying fuel may alternatively be disposed outside the pipes 18. In this case, the inner connecting pipe 20 extends through the wall of the pipe 18.

FIG. 4 shows also a nozzle body which is particularly suitable for liquid fuel. The inner connecting pipe 20 is shorter than the outer connecting pipe 21 and terminates in the inner nozzle body member 22. The latter is formed with an outlet opening 23 disposed below a constricting plate 24, which is secured in the outer nozzle body member 25 by flanges 26. Below plate 24 is a mixing chamber 27, from which the fuel-air mixture flows through the annular space 28 to the outlet opening 29.

The advantages which are afforded by this invention reside particularly in that the combustion air and fuel are jointly blown through a multiplicity of burner nozzles into the fluidized bed from below. In each burner nozzle, gaseous, vaporous or liquid fuel at a metered rate is admixed to the combustion air as it flows out of the nozzle body or immediately before. The combustion will begin immediately and will be completed within very short time in the fluidized bed. It is possible to use a very low excess of air and a fluidized bed having a relatively small height, e.g., of 0.5 to 1.0 meter. In that case, it is mostly sufficient to compress the combustion air by a blower to form 1000 to 1500 millimeters water and with heavy solids to as much as 2000 millimeters water.

The nozzle bodies according to this invention are designed to prevent an entry of falling solid particles from the fluidized bed. If the fuel stream is temporarily throttled or interrupted to control the temperature in the heated fluidized bed, solid particles may enter the fuel distributor through the fuel outlet openings and the inner connecting pipes of the nozzle connections. For this reason, it is suitable to porvide the fuel distributor with cleaning pipes or bins, from which such particles that have fallen throuh are temporarily removed.

Where a fluidized bed having a height of 0.5 meter is to be maintained, the maximum spacing between the individual nozzle connections amounts to 0.3 meter. If the fluidized bed should have a height of 1 meter, the spacing may be as large as 0.5 meter. The cross-sectional area of the bed per nozzle connection is 0.09 square centimeter in the former case and 0.25 square centimeter in the latter case.

Having now described the means by which the objects of this invention are obtained, we claim:

1. Apparatus including a chamber having a bottom and containing a bed of finely divided material capable of being fluidized, at least one air chamber disposed below said bottom, a fuel chamber disposed below said air chamber, a plurality of connections consisting of two pipes, one within the other, each said outer pipe connected at its bottom with said air chamber and each of said inner pipe being connected to said fuel chamber, each said inner pipe extending beyond the said outer pipe and terminates in said burner element means and is provided with generally horizontal outlet openings close above the vertical outlet opening of the burner means connected to said outer piper, a horizontal constricting plate mounted in said burner means for defining a narrow annular gap within said outer pipe, said plurality of connections extending upwardly from said bottom into said bed of finely divided material and said connections being arranged in a horizontal array equally spaced with respect to said bottom, said burner element means being operatively connected to each said connection at the top thereof to be positioned in said bed of finely divided material above said bottom, whereby, said fuel may be burned in said bed of finely divided material and the flow of the air and fuel and the resultant hot gases entrains the finely divided material to fluidize the material and agitate it.

2. Apparatus as claimed in claim 1, in which the bottom of said chamber below said bed of material constitutes at least a portion of the top of said air chamber and the bottom of said air chamber constitutes the top of said fuel chamber.

3. Apparatus as claimed in claim 1, in which a plurality of air and of fuel chambers are provided each said air chamber consisting of a tube and each fuel chamber consisting of a smaller diameter tube disposed within said air chamber tube.

4. Apparatus as claimed in claim 1, in which a plurality of air chambers are provided each consisting of a tube, said tubes lying in parallel to form a grate-like chamber bottom, and a like number of fuel chambers are provided each consisting of a fuel tube positioned below its associated air chamber, said inner pipes connected to said fuel chamber tubes extending upwardly through the bottom wall of said associated air chamber, then upwardly through a said outer pipe.

References Cited

UNITED STATES PATENTS 2,729,428   1/1956   Milmore _____ 34—57 A

JAMES H. TAYMAN, JR., Primary Examiner

U.S. Cl. X.R.

23—284, 288 S; 165—104; 110—28 J; 432—58